C. W. SELLERS.
PNEUMATIC FEEDER FOR THRESHING MACHINES.
APPLICATION FILED JAN. 19, 1906.

901,490.

Patented Oct. 20, 1908.
6 SHEETS—SHEET 1.

Witnesses:

Inventor,
C. W. Sellers
By F. G. Fischer
Atty.

C. W. SELLERS.
PNEUMATIC FEEDER FOR THRESHING MACHINES.
APPLICATION FILED JAN. 19, 1906.

901,490.

Patented Oct. 20, 1908
6 SHEETS—SHEET 2

Witnesses:
R. E. Hamilton.
J. Moore.

Inventor,
C. W. Sellers
By F. G. Fischer
Atty.

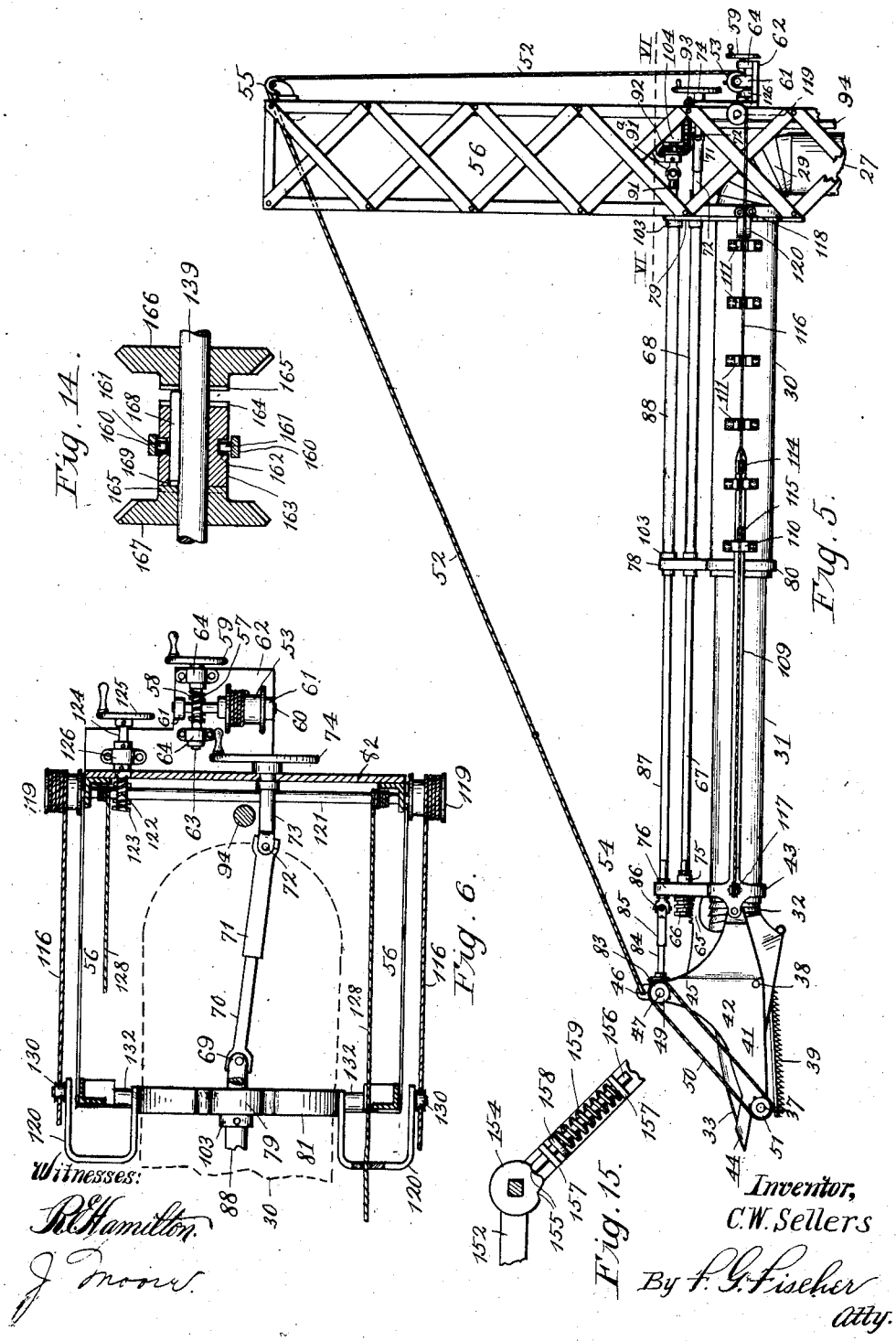

C. W. SELLERS.
PNEUMATIC FEEDER FOR THRESHING MACHINES.
APPLICATION FILED JAN. 19, 1906.
901,490.
Patented Oct. 20, 1908.
6 SHEETS—SHEET 5.
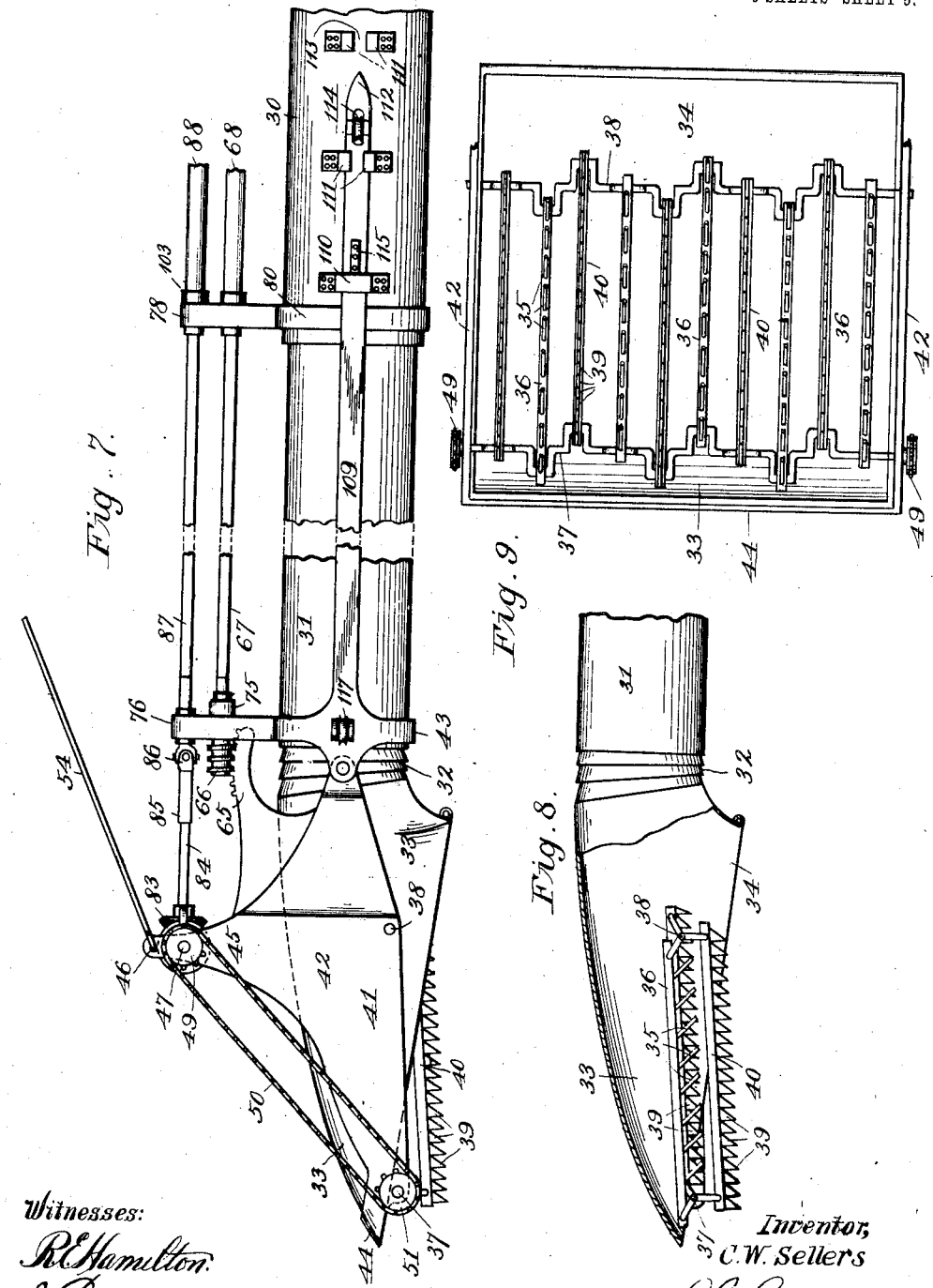
Witnesses:
R. E. Hamilton
J. Moore
Inventor,
C. W. Sellers
By F. G. Fischer
Atty.

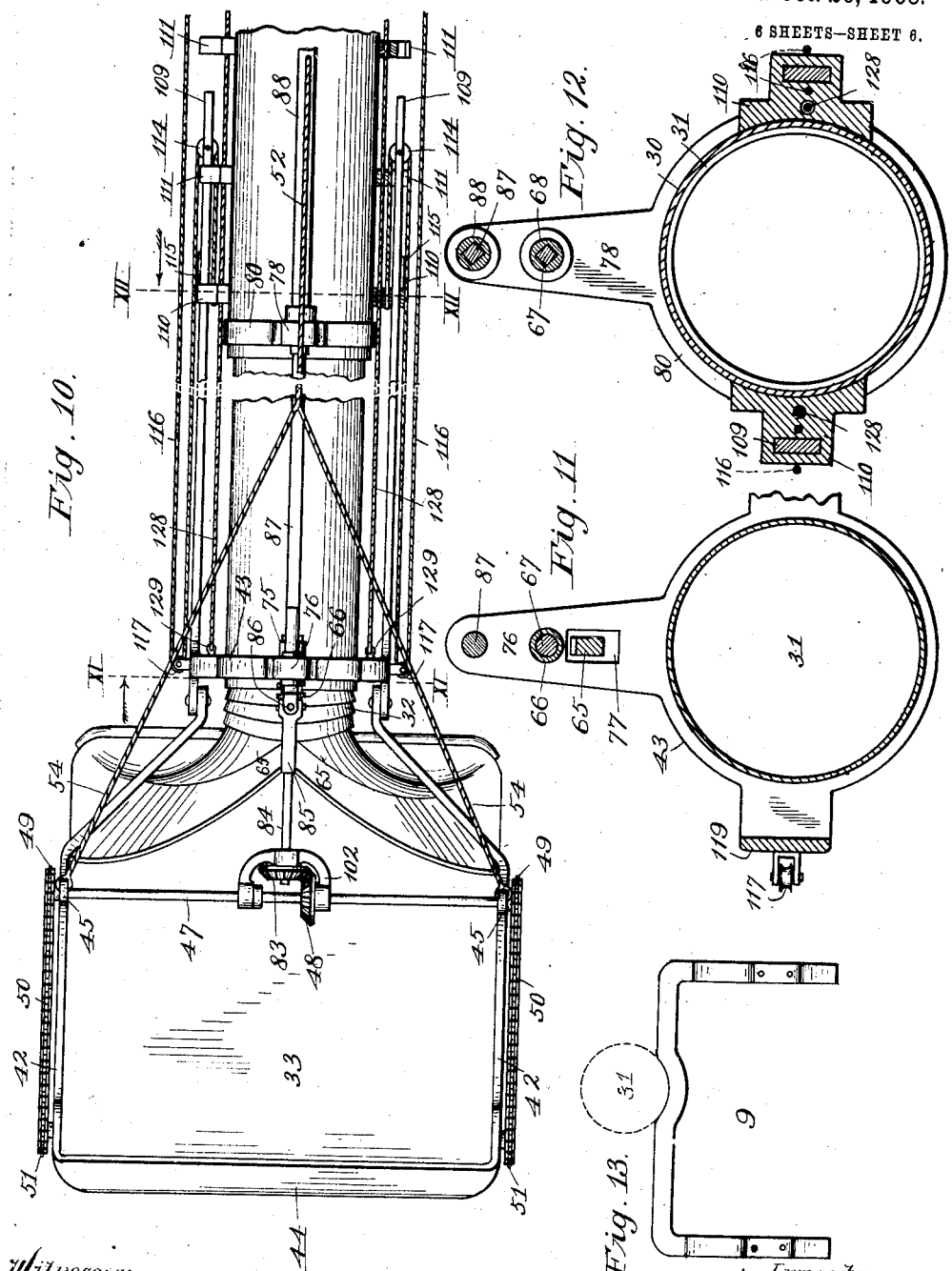

UNITED STATES PATENT OFFICE.

CORY W. SELLERS, OF BELOIT, KANSAS.

PNEUMATIC FEEDER FOR THRESHING-MACHINES.

No. 901,490.

Specification of Letters Patent.

Patented Oct. 20, 1908.

Application filed January 19, 1906. Serial No. 296,898.

*To all whom it may concern:*

Be it known that I, CORY W. SELLERS, a citizen of the United States, residing at Beloit, in the county of Mitchell and State of Kansas, have invented a Pneumatic Feeder for Threshing-Machines, of which the following is a specification.

My invention relates to a pneumatic feeder for threshing-machines, and is, so far as I am aware, the primary invention of its class.

The invention consists broadly in the combination with a threshing-machine, of an adjustable tube for conducting grain from the stack to the cylinder of the machine, and a fan, or its equivalent, for creating a blast through said tube.

Another feature of the invention resides in a head adjustably secured to the forward end of the tube so that it may accommodate itself to the upper surface of the stack.

A further feature consists of a feeder arranged at the mouth of the tube for loosening the grain in the stack, severing the cords when it is bound in bundles and uniformly feeding the grain to the tube.

Another feature consists in rigging for adjusting the tube in a vertical plane so that the latter may be raised or lowered as desired.

A further feature consists of means for swinging the tube in a horizontal plane so that its feed end may be made to oscillate over the stack and thus take the grain from the latter in a uniform manner.

Another feature of the invention resides in means for extending and telescoping the tube so that it may be adjusted to the desired point.

As the construction and arrangement of the above-mentioned features may be modified I do not limit myself to the construction shown and hereinafter described.

Figure 1:
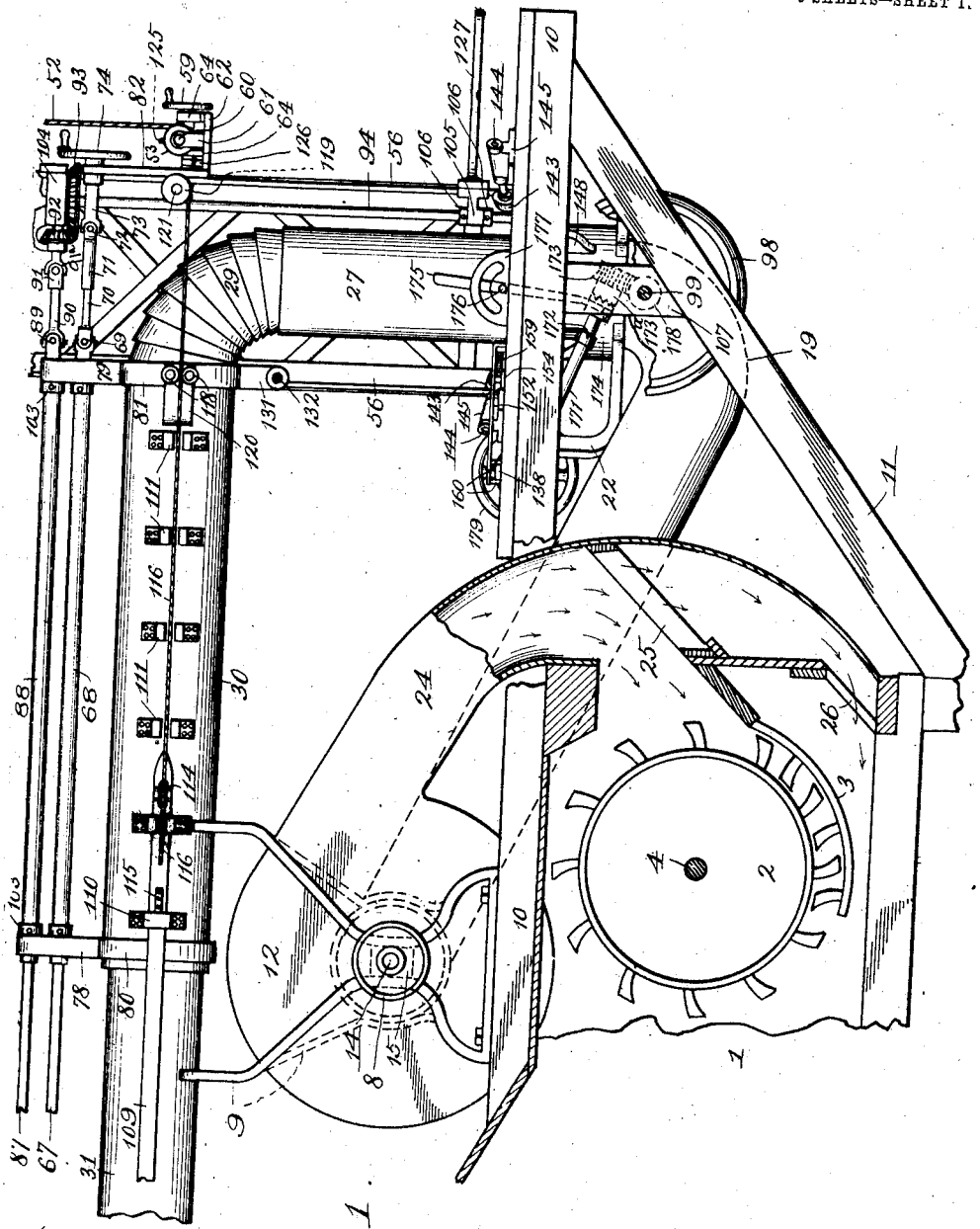
Figure 2:
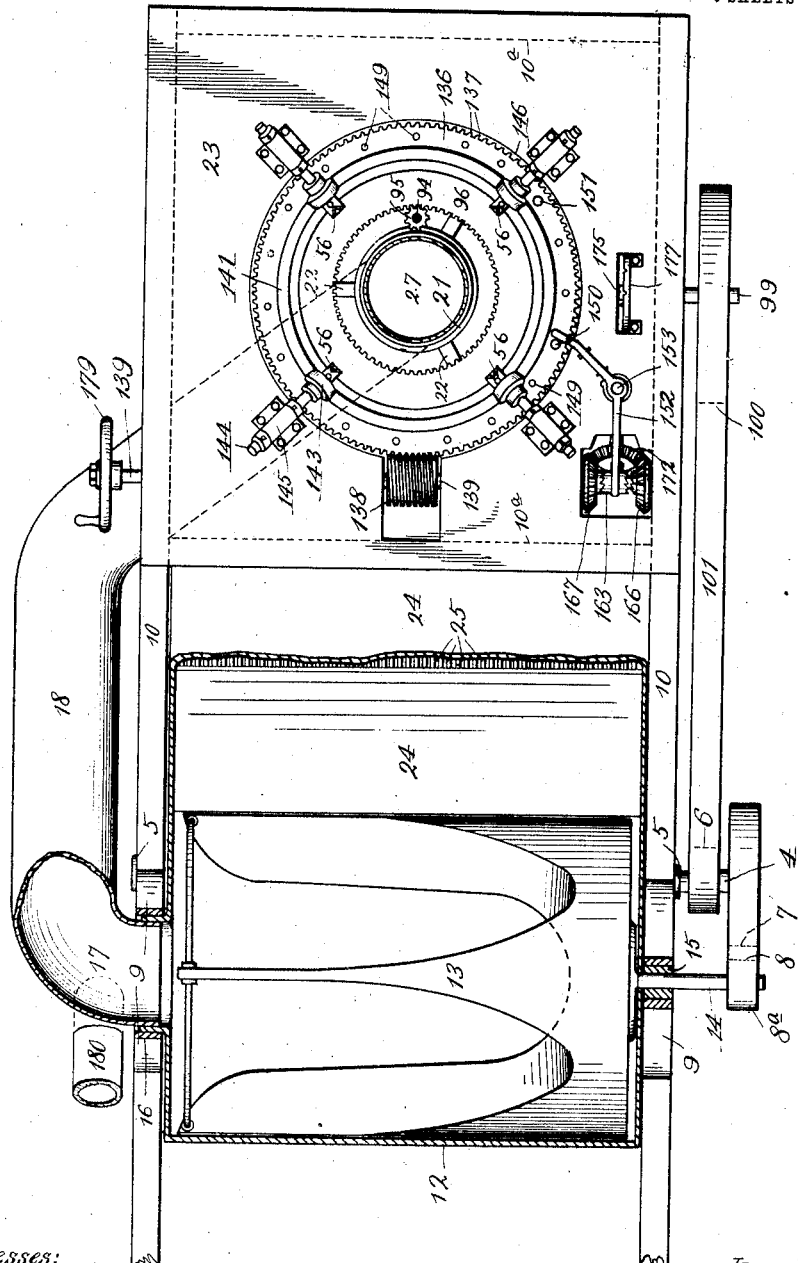
Figure 3:
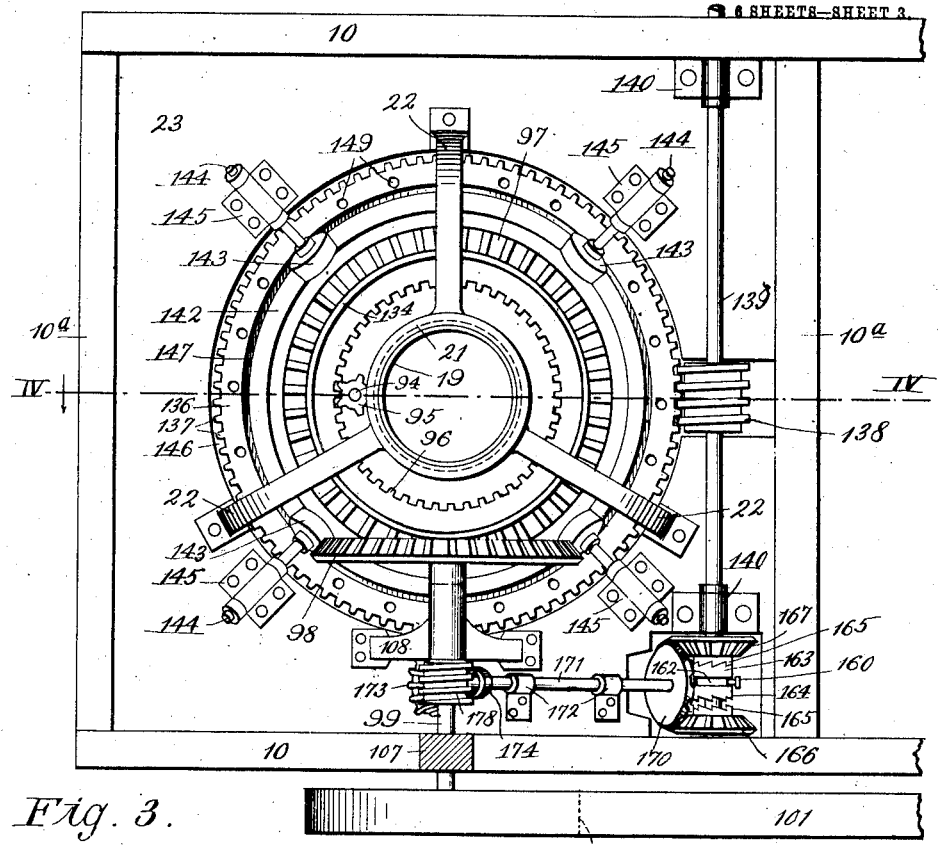
Figure 4:
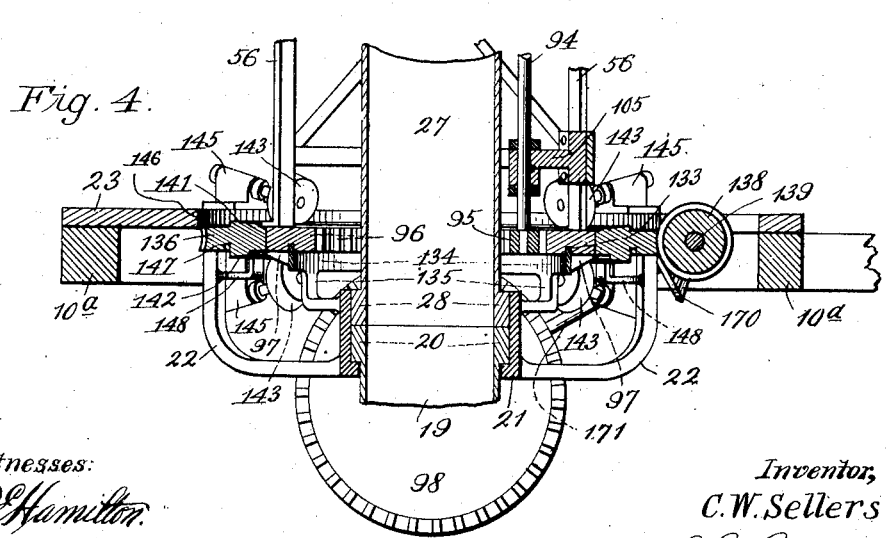

Other features of the invention will hereinafter appear, and in order that said invention may be fully understood reference will now be made to the accompanying drawings, in which:

Figure 1 shows a broken side elevation of the feeder applied to the forward end of a threshing-machine, the latter being in vertical section. Fig. 2 is a horizontal section of same on an irregular plane drawn through the axis of the fan. Fig. 3 is an inverted plan view of a turn-table and its operating mechanism all of which form a part of the invention. Fig. 4 is a vertical section of same taken on line IV—IV of Fig. 3. Fig. 5 is a broken side elevation of a suction-tube and a portion of the mechanism for operating same. Fig. 6 is a transverse section taken on line VI—VI of Fig. 5 with the rear portion of the suction-tube in dotted lines. Fig. 7 is a broken side elevation of the front portion of the suction-tube. Fig. 8 is a vertical section of same showing the feeding mechanism carried thereby. Fig. 9 is an inverted plan view of the same. Fig. 10 is a broken plan view of the forward portion of the suction tube. Fig. 11 is a transverse section of same taken on line XI—XI of Fig. 10. Fig. 12 is a transverse section taken on line XII—XII of Fig. 10. Fig. 13 is a front elevation of a frame for supporting the forward portion of the suction-tube when the latter is at rest and for supporting the case of a suction-fan employed in carrying out the invention. Fig. 14 is a transverse section of a portion of the gearing for reversing the motion of the turn-table. Fig. 15 is a broken inverted plan view of the shifting-lever employed in reversing the motion of said turn-table.

In said drawings, 1 designates the forward portion of a threshing-machine provided with the customary cylinder 2 and concave 3. Cylinder 2 is mounted upon a transverse shaft 4 journaled in bearings 5 and provided at one end with two fixed pulleys 6 and 7.

9 designates an irregular shaped frame carried by a pair of sills 10 projecting from the upper forward portion of the threshing-machine and having their forward ends supported by braces 11.

12 designates a case secured to frame 9 and inclosing a suction-fan 13 mounted at one end upon a stub-shaft 14 journaled in a bearing 15 secured to one side of frame 9.

8 designates a pulley fixed to the outer end of shaft 14 and driven by pulley 7 through the instrumentality of an endless belt 8ª.

The inlet end of case 12 is provided with a flange 16 secured to the adjacent side of frame 9 for the reception of one end of an elbow 17, forming part of the rear section of a suction tube 18 provided at its opposite end with an upturned elbow 19 provided with an annular shoulder 20 supported in the lower portion of a socket 21, carried by three arms

22 secured to the underside of a rectangular plate 23 secured upon the forward portions of sills 10 and cross-pieces 10ª.

The discharge opening of case 12 communicates with a discharge pipe 24 communicating at its discharge end with the forward portion of the threshing-machine. Pipe 24 is curved as shown in Fig. 1, and provided with an inclined grate 25 which conducts the grain to the cylinder. The bars forming grate 25 are placed close together to prevent the grain from passing therethrough, but allow a portion of the blast from fan 13 to pass therethrough and enter an opening 26 located in front of the grain-pan, not shown. By thus dividing the blast the grain will not be blown over the cylinder and the threshed grain in the grain-pan will be agitated and cleansed of chaff by the air blowing therethrough.

27 designates a vertical section of the suction-tube provided at its lower terminal with an annular shoulder 28 abutting against shoulder 20 and swiveled in the uper portion of socket 21 so that said section 27 may rotate on its vertical axis. The remainder of the suction-tube consists of a flexible elbow 29 communicating with the upper terminal of section 27, a section 30 communicating at its rear terminal with the upper portion of elbow 29, a section 31 telescopically arranged in section 30, a flexible joint 32 communicating with the forward end of section 31, and an enlarged head 33 communicating with the front end of joint 32 and having a mouth 34 at its underside to receive the grain.

Grain is fed from the stack into mouth 34 by means of a plurality of rakes and band-cutters the former of which consist of teeth 35 depending from bars 36 loosely mounted at their opposite ends upon multi-crank-shafts 37 38. Teeth 35 are inclined rearwardly so that they will pick up grain from the upper portion of the stack and carry it backwardly into mouth 34 so that the suction created by fan 13 will draw the grain backwardly through the suction-tube, force it into pipe 24 and discharge it at the clyinder. If the grain be in bundles the cords binding the latter will be severed by blades 39 which also assist the rakes in scattering and feeding the grain in a uniform manner to mouth 34. Blades 39 depend from bars 40 loosely secured at their opposite ends to the shafts 37 38 the cranks of which are arranged so that a portion of the rakes and blades will always be in contact with the grain.

The ends of shafts 37 and 38 extend through the opposite sides of head 33 and are journaled in a casting 41 consisting of two side-members 42 pivoted at their rear ends to a collar 43 and united at their forward ends with a transverse portion 44 embracing the lower front portion of head 33 in order to reinforce and protect the latter from injury. Side portions 42 have upturned extensions 45 provided with eyes 46 and forming bearings for a transverse shaft 47 journaled therein. Shaft 47 is driven by a bevel-gear-wheel 48 and provided at its opposite ends with a pair of fixed sprocket-wheels 49 for imparting motion through the instrumentality of endless sprocket-chains 50 to a pair of sprocket-wheels 51 fixed upon the ends of shaft 37 for the purpose of driving the latter.

Sections 30 31 and head 33 of the suction-tube are adjusted vertically from elbow 29 by means of a cable 52 and a drum 53 upon which its rear end is wound. The forward poi on of cable 52 has two strands 54 attached at their diverging ends to eyes 46 in order to balance head 33. Cable 52 passes upwardly and rearwardly over a guide-pulley 55 carried at the upper end of a tower 56, and the lower rear end of said cable is attached to drum 53 as above described. Said drum is rotated to either wind or unwind the cable by means of a worm-wheel 57, a worm 58 meshing therewith, and a hand-wheel 59. Worm-wheel 57 is fixed upon the drum-shaft 60 journaled in bearings 61 secured to a bracket 62 secured to the rear side of the tower. Worm 58 and hand-wheel 59 are fixed upon a shaft 63 journaled in bearings 64 secured to bracket 62.

Head 33 is adjusted vertically from joint 32 independently of the suction-tube so that its mouth 34 and the feeding mechanism carried thereby may always be retained in proper relation to the upper surface of the stack. This adjustment is obtained by self-locking mechanism consisting of a segmental rack 65 secured to side-members 42 and intermeshing with a worm 66, fixed upon the forward end of a shaft 67 telescopically arranged in a tubular shaft 68 secured at its rear end by means of a universal joint 69 to a short shaft-section 70 telescopically arranged in a tubular shaft 71 secured by a universal joint 72 to a short shaft section 73 provided at its rear end with a hand-wheel 74. Shaft 67 is journaled in a bearing 75 and is rectangular in cross-section the greater portion of its length so that it may slide longitudinally within the snugly fitting bore of shaft 68 and be rotated by the latter.

Bearing 75 is carried by a vertical arm 76 having a slot 77 for the passage of rack 65 and fixed at its lower end to a collar 43 fixed to the forward end of section 31.

Shaft 68 is journaled in arms 78 and 79 fixed at their lower ends to collars 80 81, respectively, fixed to the ends of section 30. Shaft 73 is journaled in the upper portion of a plate 82 secured to the rear side of the tower. By arranging the shafting and driving worm 66 as above described it is obvious that said shafting may be either telescoped or extended with section 31, and may, through the instrumentality of the universal joints 69 72, move upward and downward with sections 30 and 31 without disengaging said worm from rack 65, or changing the position of hand-wheel 74.

Bevel-wheel 48 is driven by a bevel-wheel 83 fixed upon the forward end of a shaft 84 telescopically arranged in a tubular shaft 85, secured by a universal joint 86 to a shaft 87 telescopically arranged in tubular shaft 88 connected by a flexible joint 89 to a short shaft 90 telescopically arranged in a short tubular shaft 91 provided at its rear end with a universal joint 91ᵃ and a fixed bevel-wheel 92 which is driven by a bevel gear-wheel 93.

Bevel gear-wheel 93 is fixed upon the upper portion of a vertical shaft 94 provided at its lower end with a fixed pinion 95 which is driven by an annular cog-wheel 96 provided at its underside with bevel-teeth 97 which intermesh with a bevel-wheel 98 fixed upon the inner end of a shaft 99 driven by a pulley 100.

Pulley 100 is driven by means of pulley 6 through the instrumentality of an endless belt 101. Pulley 100 is, preferably, loosely mounted upon shaft 99 so that it will not drive the latter until the cylinder attains threshing-speed, when it is locked upon said shaft in the well known manner by means of a friction-clutch, not shown.

Shaft 84 is rectangular in cross-section so that it may slide in the rectangular bore of shaft 85 and be rotated by the latter and its forward end is journaled in a yoke 102 carried by shaft 47. Shaft 87 is journaled in arm 76 and is rectangular in cross-section so that it may slide in the rectangular bore of shaft 88 and be rotated by the latter. Shaft 88 is journaled in arms 78 79 and provided with collars 103 which abut against said arms to prevent the shaft from shifting longitudinally. Shaft 90 is rectangular in cross-section so that it may slide in the rectangular bore of shaft 91 and be turned by the latter which is journaled at its rear end in a bearing 104 secured to the rear portion of the tower. With the above arrangement it is obvious that the shafting may be adjusted longitudinally with section 31 or adjusted vertically with sections 30 31 and head 33 without disengaging bevel-wheels 83 from bevel-wheels 48 93, respectively. Shaft 94 is journaled in a bearing 104 and a bearing 105 and provided with collars 106 which abut against bearing 105 and thus prevent longitudinal movement of said shaft. Bearing 105 is secured to the lower portion of the tower. Shaft 99 is journaled in a bearing 107 and a hanger 108 which is secured to the underside of plate 23.

Section 31 is adjusted longitudinally in section 30 by a pair of arms 109 extending rearwardly from the opposite sides of collar 43 and through a pair of stops 110 secured to the opposite sides of the front portion of section 30. The opposite sides of said section are provided with clips 111 arranged in longitudinal alinement so that arms 109 may pass therethrough when adjusted longitudinally, the rear ends of said arms being pointed as indicated at 112 so that they will readily pass backwardly between the clips which have spaces 113 for the passage of sheave-wheels 114 journaled in the rear portions of said arms. The rear portions are also provided with stop-blocks 115 adapted to abut against stops 110 and thus limit the forward movement of the arms. The arms are moved outwardly, in order to extend section 31, by a pair of cables 116 attached at their forward ends to stops 110, then extend rearwardly around sheave-wheels 114, thence forwardly around a pair of sheave-wheels 117, thence rearwardly between guide-wheels 118 and are secured at their rear terminals to a pair of drums 119 upon which they are wound or unwound as desired.

Guide-wheels 118 are arranged in longitudinal alinement with the arms and maintained in this position by means of a pair of yokes 120 so that cables 116 may exert a straight pull upon said arms irrespective of the vertical adjustment of sections 30 and 31. Yokes 120 are secured to the opposite sides of collar 81. Drums 119 are fixed upon the opposite ends of a transverse shaft 121 journaled in the opposite sides of the tower and provided with a fixed worm-wheel 122 driven by worm 123 fixed upon the forward end of a shaft 124 operated by hand-wheel 125. Shaft 124 is journaled in a bearing 126 secured to bracket 62. Hand-wheels 59, 74 and 125 are arranged within convenient reach of an operator standing upon a platform 127 secured to the rear lower portion of the tower.

The arms are drawn rearwardly, in order to move section 31 backwardly in section 30, by a pair of cables 128 secured at their forward ends to eyes 129, thence extend rearwardly through openings in stops 110 and brackets 111 and are secured to shaft 121 in such manner that when they are wound thereon cables 116 will be unwound from the drums and thus permit the arms to move rearwardly, and vice versa. Cables 128 extend between guide-wheels 130 for holding that portion of the cables between eyes 129 and said guide-wheels in alinement with sections 30 and 31.

Yokes 120 are U-shaped in plan view so that they will not contact with the front corners of the tower when sections 30 and 31 are swung upwardly or downwardly. Collar 81 is provided with a downwardly extending arm 131 pivotally secured upon a transverse shaft 132 secured to the forward portion of the tower in order to control the movement of flexible elbow 29.

Cog-wheel 96 is provided at its underside with an annular groove 133 for the reception of an annular bearing 134 upon which said cog-wheel is journaled. Bearing 134 is supported by three arms 135 arranged vertically above arms 22 and secured to the upper portion of socket 21.

That portion of the suction-tube consisting of sections 27, 30 and 31 are swung in a horizontal plane, turning at the joint formed between socket 21 and shoulder 28, by mechanism consisting of an annular turn-table 136 loosely embracing cog-wheel 96 and provided at its periphery with cog-teeth 137 which mesh with and are driven by a worm 138 fixed upon a transverse shaft 139 journaled in bearings 140 depending from the underside of plate 23.

Turn-table 136 is provided at its upper and lower surfaces with annular tracks 141 142, respectively, and is held in a horizontal plane by conical rollers 143 engaging said tracks and mounted upon shafts 144, journaled in bearings 145 secured to the upper and lower surfaces of plate 23 having a centrally disposed annular opening 146 for the reception of the turn-table, which latter carries the tower (see Fig. 4). The lower corner posts of the tower overlap cog-wheel 96 and thus prevent the latter from moving upwardly, there being a slight space, however, between the upper surface of said cog-wheel and the lower portion of the posts to prevent the former from rubbing against the latter and thus creating friction. Turn-table 136 is provided at its underside with an annular groove 147 for the reception of the upturned portions of brackets 148 which prevent said turn-table from shifting longitudinally and thus causing undue friction between its inner surface and the periphery of cog-wheel 96. The turn-table is also provided with an annular series of holes 149 for the reception of two pins 150 151 projecting upwardly so that they will contact with the rear terminal of a shifting lever 152 arranged in the path thereof and adapted to be thrown in opposite directions by said pins. Lever 152 is fulcrumed upon a pin 153 projecting upwardly from a fixed cam 154 having two notches 155 which are alternately engaged by a detent 156 as the lever is shifted back and forth.

Detent 156 is slidably arranged in ears 157 in the underside of the lever and provided with a fixed collar 158 against which one end of an expansion-spring 159 abuts in order to hold the forward terminal of said detent in engagement with the cam. With this arrangement the lever is reliably held in either of its positions until shifted by the pins.

The rear end of lever 152 has a forked depending member 160 provided with pins 161 engaging the opposite sides of a peripheral groove 162, centrally-disposed in a clutch 163 provided at its ends with oppositely-disposed teeth 164 adapted to alternately engage similar teeth 165 integral with the hubs of bevel gears 166 167 loosely mounted upon shaft 139.

Clutch 163 is slidably mounted upon shaft 139 but is caused to turn therewith by a feather 168, fitting into its longitudinal groove 169, so that when said clutch is alternately shifted by lever 162 into engagement with bevel-gears 166 167 it will lock them upon shaft 139 and thus cause them to alternately rotate shaft 139 in reverse directions. With this arrangement it is obvious that when one of the bevel-gears is rotating the turn-table in one direction, through the instrumentality of worms 138, said turn table will continue in said direction until one of the pins, say for instance, 150 contacts with the free end of the lever 152 and causes said lever to shift the clutch into engagement with the other bevel-gear, when the latter will immediately reverse the movement of worm 138 and the turn-table until pin 151 contacts with the shifting lever and causes it to draw the clutch into engagement with the first-mentioned bevel-gear. Thus the turn-table, together with the tower and the swiveled portion of the suction-tube will be caused to oscillate and swing the feed end of said suction-tube back and forth over the stack, the length of the sweep being determined by the disposition of pins 150 151. For instance, when the pins are disposed, as shown in Fig. 2, the sweep will be comparatively short, but when pin 151 is placed in hole 149ᵃ the length of the sweep will be increased to almost a complete circle. By removing one or both pins the turn-table and parts carried thereby may be rotated a complete revolution.

Bevel gears 166 167 are driven in reverse directions by an intermeshing bevel-gear-wheel 170, fixed upon the upper end of the inclined shaft 171, journaled in bearings 172 and driven by a worm-wheel 173 loosely mounted upon its lower terminal and provided with a clutch-member 173ᵃ normally engaged by a clutch-member 174 mounted upon shaft 171 and, which, like clutch-member 163, is arranged to slide upon and rotate with its shaft. Clutch-member 164 is shifted into and out of engagement with clutch-member 173ᵃ by means of a hand-lever 175 fulcrumed upon a pin 176 projecting from a segment 177.

Worm-wheel 173 is driven by worm 178 fixed upon shaft 99. When it is desired to slowly adjust the suction-tube in a horizontal plane, for instance when it is desired to bring it to rest in the concave portion of frame 9, clutch-member 174 is drawn out of engagement with clutch-member 173ª so that worm 138 and the turn-table may be rotated by means of a hand-wheel 179 fixed upon one end of shaft 139.

180 designates the discharge end of a tailing-spout communicating with the suction-tube near its entrance to the fan case so that the fan will draw the tailings through the spout and return them to the cylinder through the discharge pipe.

From the above description it is obvious that I have provided a pneumatic feeder which may be adjusted vertically so that its inlet end may be elevated to the top of the stack and gradually lowered as the grain is taken from the latter, which may be oscillated in a horizontal plane so that it will sweep back and forth over the upper surface of the stack and thus take the grain evenly therefrom, and which may be extended or contracted as desired.

While I have shown the fan communicating with the rear portion of the suction-tube it could be located at the forward end of the latter and thus force the grain through said tube, but I find by practice that it is desirable to locate the same upon the threshing-machine and thus relieve the forward end of the tube of all unnecessary weight. The action of the fan is also more effective when sucking the grain through the tube than when forcing it therethrough.

Having thus described my invention, what I claim and desire to secure by Letters-Patent, is:—

1. In a pneumatic feeder, in combination, a threshing-machine, an adjustable tube leading to the cylinder end of said threshing-machine, means for creating a blast through said tube so that grain may be carried from a stack to the cylinder end of the threshing-machine, and means for oscillating the tube.

2. In a pneumatic feeder, in combination, a threshing-machine, an adjustable tube leading to the cylinder end of said threshing-machine and communicating therewith through upper and lower openings, a grate communicating with the upper opening, means for creating a blast through said tube so that grain may be carried from a stack to the cylinder end of the threshing-machine, and means for adjusting the tube in a vertical plane.

3. A pneumatic feeder for threshing-machines consisting of an adjustable tube leading to the cylinder end of the threshing-machine, means for creating a blast through said tube, a feeder at the mouth of the tube, and flexible gearing for actuating said feeder.

4. A pneumatic feeder for threshing-machines consisting of an adjustable tube leading to the cylinder end of the threshing-machine, means for creating a blast through said tube, and a feeder at the mouth of the tube including rearwardly inclined teeth.

5. A pneumatic feeder for threshing-machines consisting of an adjustable tube leading to the cylinder end of the threshing-machine, means for creating a blast through said tube, a feeder at the mouth of the tube, and band-cutters forming part of said feeder.

6. A pneumatic feeder for threshing-machines consisting of an adjustable tube leading to the cylinder end of the threshing-machine, means for creating a blast through said tube, driven crank-shafts journaled in the mouth of the tube, bars connecting said crank-shafts, teeth projecting from a number of said bars, and blades secured to the remainder of the bars.

7. A pneumatic feeder for threshing machines consisting of an adjustable tube leading to the cylinder end of the threshing-machine, means for creating a blast through said tube, and a head adjustably secured to the end of the tube.

8. A pneumatic feeder for threshing-machines consisting of an adjustable tube leading to the cylinder end of the threshing-machine, means for creating a blast through said tube, a head adjustably secured to the end of the tube, and self-locking mechanism for adjusting said head vertically.

9. A pneumatic feeder for threshing-machines consisting of a telescopic tube leading to the cylinder end of the threshing-machine, means for creating a blast through said tube, arms adjustably connecting the sections of the tube, cables attached at their forward ends to said arms and at their rear terminals to drums for extending the sections, and cables attached to the forward section for telescoping the tube.

10. A pneumatic feeder for threshing-machines consisting of an adjustable tube leading to the cylinder end of the threshing-machine, means for creating a blast through said tube, a head adjustably secured to the front end of the tube, gear-wheels for adjusting said head, and flexible shafting upon which said gear-wheels are mounted.

11. A pneumatic feeder for threshing-machines consisting of a telescopic tube leading to the cylinder end of the threshing-machine, means for creating a blast through said tube, a feeder at the forward end of said tube, gearing for operating said feeder, and telescopic shafting upon which said gearing is mounted.

12. A pneumatic feeder for threshing-machines consisting of a telescopic tube leading to the cylinder end of the threshing-machine, means for creating a blast through said tube, a head adjustably secured to the front end of said tube, gear-wheels for adjusting said head, and flexible telescopic shafting upon which said gear-wheels are mounted.

13. A pneumatic feeder for threshing-machines consisting of an adjustable tube leading to the cylinder end of the threshing-machine, means for creating a blast through said tube, crank shafts journaled in the mouth of said tube, rakes carried by said shafts, band-cutters also carried by said shafts, sprocket gearing for driving one of said shafts, gear-wheels for driving said sprocket-gearing, and flexible shafting upon which said gear-wheels are mounted.

14. A pneumatic feeder for threshing-machines consisting of an adjustable tube leading to the cylinder end of the threshing-machine, means for creating a blast through said tube, a feeder carried at the mouth of the tube, gear-wheels for operating said feeder, and adjustable shafting upon which said gear-wheels are mounted.

15. A pneumatic feeder for threshing-machines consisting of an adjustable tube leading to the cylinder end of the threshing-machine, means for creating a blast through said tube, a tower adjustably mounted with said tube, a guide-pulley carried by the upper portion of said tower, a drum also carried by said tower, and a drum cable attached at its ends to said drum and the forward portion of the tube.

16. A pneumatic feeder for threshing-machines consisting of an adjustable tube leading to the cylinder end of the threshing-machine, means for creating a blast through said tube, and a turn-table for adjusting said tube in a horizontal plane.

17. A pneumatic feeder for threshing-machines consisting of an adjustable tube leading to the cylinder end of the threshing-machine, means for creating a blast through said tube, a turn-table for adjusting said tube in a horizontal plane, and means for automatically oscillating said turn-table.

18. A pneumatic feeder for threshing-machines consisting of an adjustable tube leading to the cylinder end of the threshing-machine, means for creating a blast through said tube, a turn-table for adjusting said tube in a horizontal plane, reversible gearing for oscillating said turn-table, and shifting mechanism for controlling said gearing.

19. A pneumatic feeder for threshing-machines consisting of an adjustable tube leading to the cylinder end of the threshing-machine, means for creating a blast through said tube, a turn-table for adjusting said tube in a horizontal plane, reversible gearing for oscillating said turn-table, a clutch forming part of said gearing, a shifting lever for adjusting said clutch, and means carried by the turn-table for operating said lever.

20. A pneumatic feeder for threshing-machines consisting of an adjustable tube leading to the cylinder end of the threshing-machine, means for creating a blast through said tube, a turn-table for adjusting said tube in a horizontal plane, reversible gearing for oscillating said turn-table, a clutch forming part of said gearing, a shifting lever for adjusting said clutch, and adjustable members carried by said turn-table for operating the lever.

21. A pneumatic feeder for threshing-machines consisting of an adjustable tube leading to the cylinder end of the threshing-machine, means for creating a blast through said tube, a turn-table for adjusting said tube in a horizontal plane, and conical rollers for retaining and supporting said turn-table in a horizontal position.

In testimony whereof I affix my signature, in the presence of two witnesses.

CORY W. SELLERS.

Witnesses:
G. B. SOMBURY,
JOE MEYER.